July 3, 1923.

F. J. FALLADA

CROWNING MACHINE

Filed Aug. 21, 1922

Witness:
A. J. Sauser

Inventor
Frank J. Fallada
By W E Williams
Atty

July 3, 1923.

F. J. FALLADA

CROWNING MACHINE

Filed Aug. 21, 1922

Witness:
C. J. Sauser.

Inventor:
Frank J. Fallada
By N. E. Williams
Atty.

Patented July 3, 1923.

1,460,577

UNITED STATES PATENT OFFICE.

FRANK JOHN FALLADA, OF CHICAGO, ILLINOIS.

CROWNING MACHINE.

Application filed August 21, 1922. Serial No. 583,109.

*To all whom it may concern:*

Be it known that I, FRANK JOHN FALLADA, a citizen of the United States, a resident of Chicago, county of Cook, and State of Illinois, with a post-office address at 1523 S. Ames Ave., have invented a new and useful Improvement in a Crowning Machine, of which the following is a specification.

My invention relates to tilling the soil, and the object of the invention is to produce a more efficient machine of the rotary disk and rotary cutter type, adapted to be used on sod ground.

Reference will be had to the accompanying drawings in which—

Figure 1:
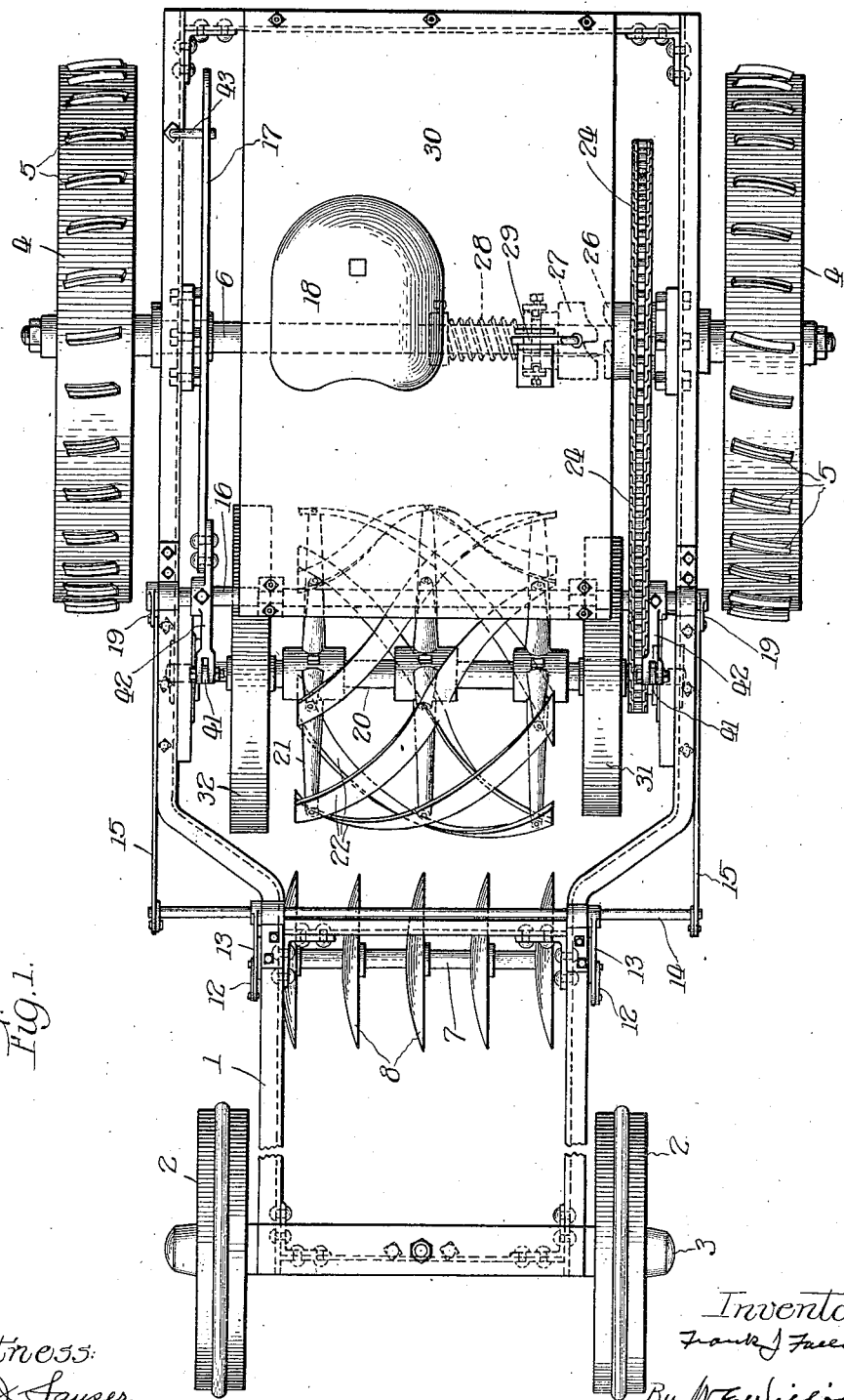
Figure 1 is a plan view of the entire machine.
Figure 2:
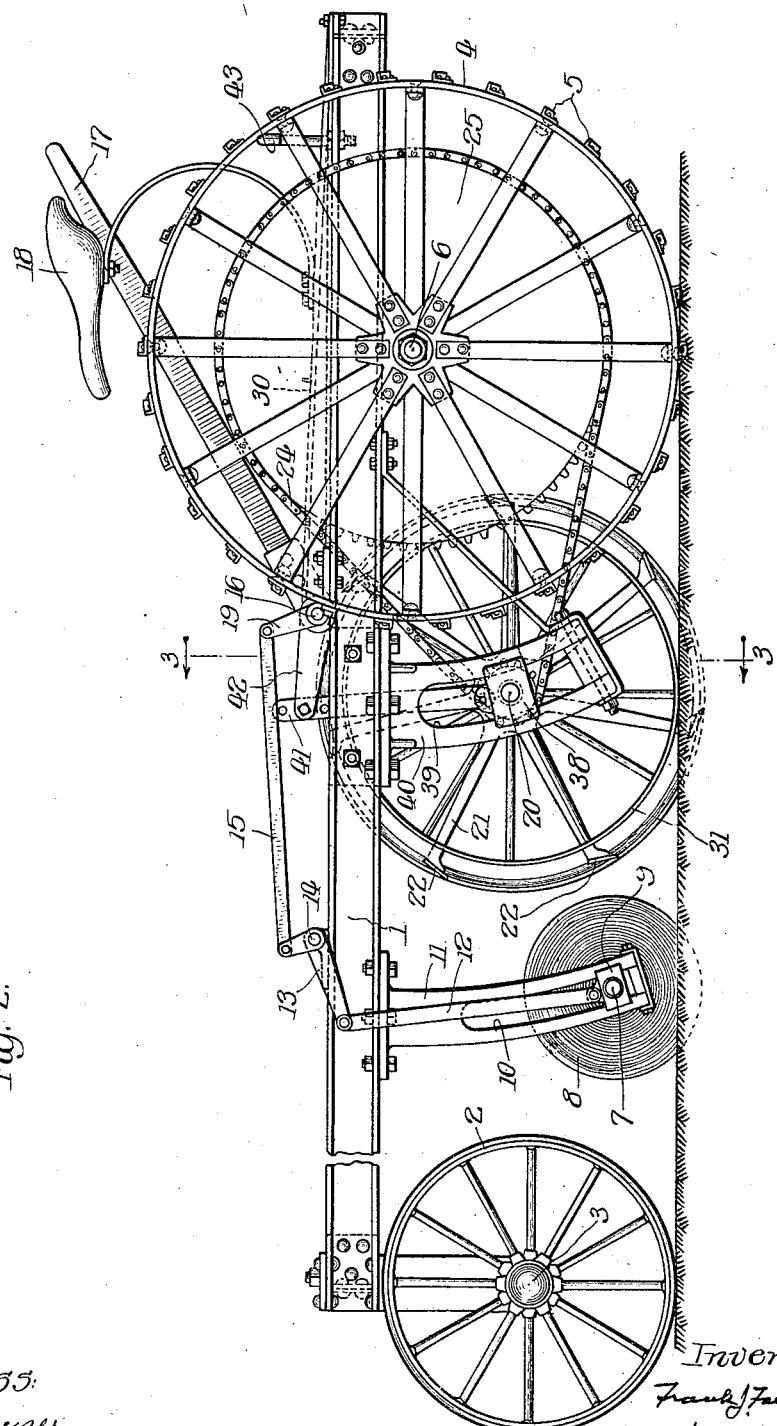
Figure 2 is a side elevation.

The machine is intended to be drawn by any suitable source of power, such as horses or a tractor attached to the front of the machine which is the left side of the drawings in Figures 1 and 2, and the said attachment may be made in any suitable manner suiting the preference of the user.

The machine is provided with a frame structure indicated by 1, and with front wheels 2, mounted on a suitable axle 3, in any suitable manner as relates to the front wheel structure of the machine. The machine is supported on two rear power wheels 4, which are provided with the blocks 5, adapted to engage the ground and these wheels are adapted to furnish power and drive the rear axle 6 as a live axle under the tractive effort of the power for moving the machine.

Mounted across the front of the machine there is an axle 7, carrying a series of rotary disks 8 in the manner of a disk harrow and this axle 7 is carried in journal boxes 9, sliding in slots 10, in a supporting bracket 11, fixed to the frame 1, and links 12 are connected to bell crank arms 13, on a shaft 14 which is connected by links 15 to a secondary shaft 16 through the medium of some arms 19, and the shaft 16 is connected to an operating lever 17, in reach of the operator perched on the seat 18.

In the rear of the rolling colters or disks 8, there is mounted a horizontal shaft 20, provided with radial arms 21, carrying spiral cutter blades 22, adapted to be revolved and cut up the sod or earth as desired.

The shaft 22 is driven by a sprocket wheel 23, under the influence of the chain 24 on a large sprocket 25, connected by a dental clutch 26 to the live or driving shaft 6. Suitable engaging and disengaging means is provided for the loose clutch block 27 of the dental clutch 26, and it is here shown in part as being composed of a spring 28 adapted to normally hold the movable clutch block 27 in place and with lever means indicated by 29 for retracting the spring and loosening the clutch. Details of this lever means are not shown. A floor 30 is provided for the convenience of the driver and to protect him from accident in connection with the rotary cutter blades 22.

On the shaft 20 there is provided an idle wheel 31, on the near side, and 32 on the off side. These wheels are intended to limit the depth into which the rotary cutter blades may cut into the soil, and they amount only to a depth gage for the cutter, it being the intention to vary the size of these wheels as the variation in depth may be required for the cutter blades 22.

Since the cutting of the soil by the spiral blades 20 is the major part of the functions of the machine, a uniform cutting is desired regardless of how the machine may ride over the ground supported by its regular supporting wheels 2 and 4, so that the unevenness of the ground may be accommodated by the wheels 31 and 32.

In Figures 1 and 2 the wheel 31 is smaller than the wheel 32, the wheel 31 rides on the land side and 32 on the cut or soft side which allows it to settle down more deeply than the wheel 31 and thus accommodate for cutting operations and also to accommodate for hillside cutting.

Figure 3:
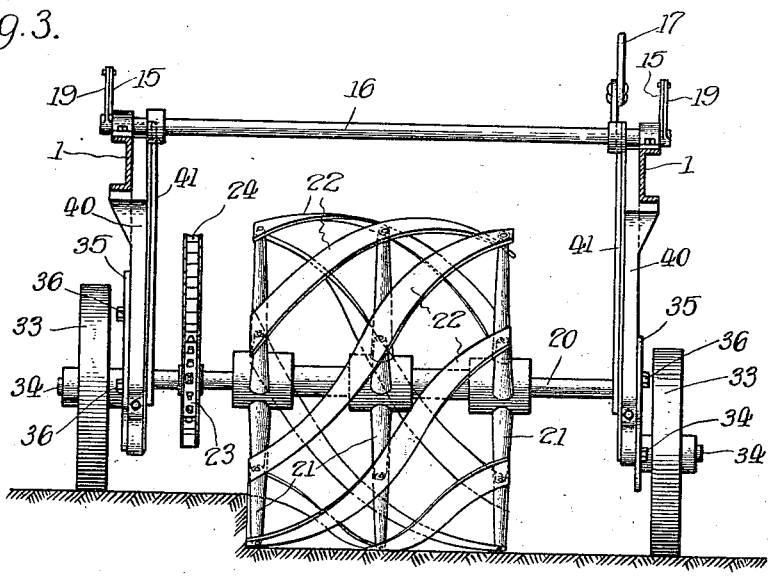
Figure 3 is a transverse section on line 3—3 of Figure 2, but showing some modifications in the mechanism.
Figure 4:
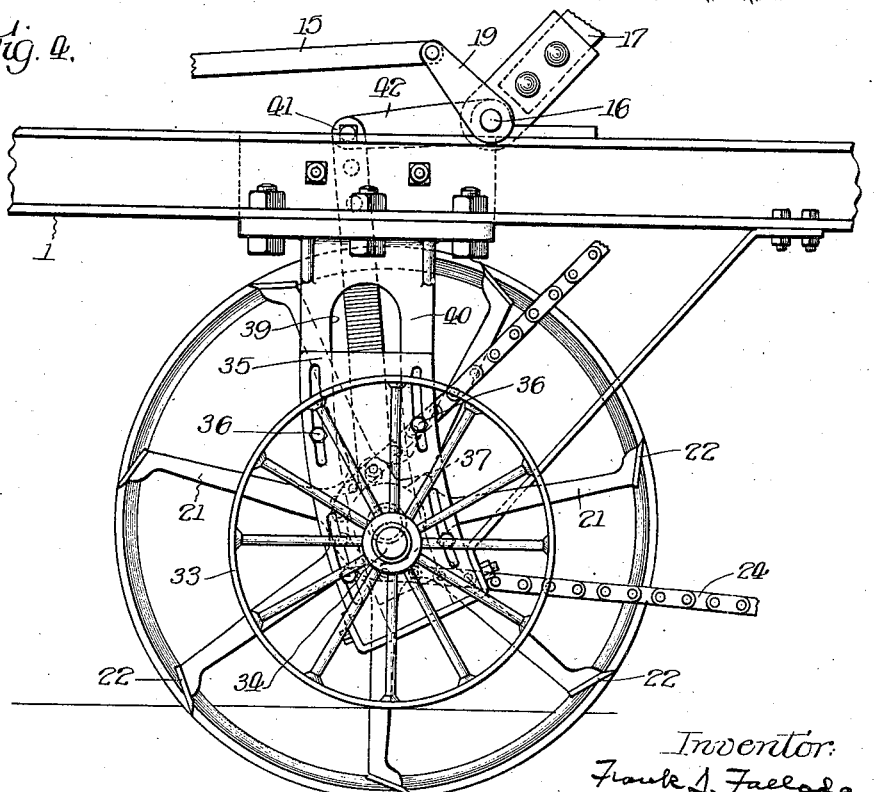
Figure 4 is an enlarged elevational view of the rotary cutter showing also some modifications.

A modified form is shown in Figure 3 for the arrangement of the supporting shaft 20 for the spiral cutters 22, these supporting wheels for the shaft 20 are indicated by 33, and are the same size but they are connected independently of each other as will be better understood from the view shown in Figure 4 wherein the wheels 33 have independent studs 34 for axles, and these studs are fixed in the adjustable plates 35 secured by adjusting bolts 36 to a secondary plate underneath the plate 35, and not shown, which is connected to the block 37 which is a duplicate of the block 38 shown in Figure 2, that carries the shaft 20.

The blocks 38 and 37 which carry the shaft 20 are guided and supported in a slot 29 of the bracket 40 connected to the frame of the machine and the said blocks 37 and 38 are controlled in the movement up and down the slot 39 by links 41 connected to arms 42 mounted on the before mentioned shaft 16 under control of the operating lever 17 before mentioned. The point being that with one operating lever 17, the rotary spiral cutters 22 and the disk harrow disks 8 are simultaneously lowered or raised by the operator as desired in the control of the machine.

The lever 17 is held downward when desired by locking lever 43 when the machine is out of service and in transit, thus holding the cutters and disks free from the ground.

While this machine may be used for any agricultural purpose for which it is found desirable, the special purpose of this machine is to crown the soil as it were, that is to cut off the top surface of the soil.

Certain crops, alfalfa for instance, is hard to kill off when another crop is intended to be substituted on the same land, and this machine is especially desirable for cutting off the top sod, serving to kill the alfalfa in a better way than any other type of machine. There are various other agricultural purposes for which only the top is intended to be shaved off, for which this machine is especially adapted.

What I claim is:—

1. In a machine of the class described, a frame mounted on supporting wheels, one set of which are geared to furnish power for revolving a rotary cutter through tractive effort, a spiral rotary cutter mounted to be revolved and driven by a traction wheel of the machine and supported in its relationship to the ground by wheels rolling on the ground and connected to float upward and downward and carry rotary cutters with them over the uneven surfaces of the ground in combination with some disk cutters placed forward of the rotary cutters and adapted to slit the ground by the movement of the machine in advance of the rotary cutters and said rotary cutters provided with means for adjusting the depth on either end thereof more or less as relates to the transverse position of the revolving cutters.

2. In a device of the class described, a machine adapted to ride on its own supporting wheels and to carry a floating adjustable frame, a series of rotary spiral cutter blades and gearing connected to traction wheels of the machine adapted to drive the said cutter blades in combination with some rolling cutters mounted in advance of the spiral cutters and adapted to slit the ground in advance of the cutters as the machine is moved over the ground and means for adjusting both sets of cutters upward or downward in relation to the ground.

3. In a device of the class described, a frame work supported on carrying and traction wheels and adapted to be drawn over the ground by tractive effort from some suitable source of power, a shaft mounted transversely on the machine in adjustable guide ways adapted to be raised and lowered in relation to the frame of the machine and connected by suitable gearing to be revolved by rotation of the traction wheels of the machine; supporting wheels for each end of the said shaft adapted to be adjusted in varying heights in relation to each end of the cutter blades mounted on the said shaft and said cutter blades adapted to cut the soil as the shaft is revolved at a speed greater than the travel of the machine.

4. In a device of the class described, a frame supported upon carrying and traction wheels and having mounted across the front portion thereof a shaft carrying disk cutters adapted to be adjusted in and out of the ground in relation to the machine, and cut longitudinal slits in the ground as the machine is drawn over the ground, a rotary cutter having transverse cutter blades adapted to be revolved and cut the soil transversely of the travel of the machine and located in the rear of the said rotary disks, gearing connected to positively drive said transverse rotary cutter from traction wheels of the machine and supporting wheels adapted to adjust the transverse rotary cutter in relation to the ground independently of the frame work of the machine, as relates to the height of the frame on the ground as supported by its carrying and traction wheels.

5. In a device of the class described, a frame work supported on front supporting wheels and rolling tractor wheels, a transverse shaft extending across the frame and behind the front supporting wheels and carrying a series of rotary cutter disks adapted to slit the ground as the machine is moved over the same, a transverse rotary cutter adapted to be revolved through gearing connected to the traction wheels and located across the machine in the rear of the said rotary disks and in front of the traction wheels in combination with some supporting wheels for the transverse rotary cutter adapted to carry the said cutter and supporting same independently of the supporting and traction wheels of the machine.

6. In a device of the class described, a transverse rotary spiral cutter mounted across the frame work of the machine and adapted to float upward and downward in relation to the ground under the influence of supporting wheels adapted to carry only the transverse spiral cutter and its mountings, supporting wheels for the said rotary cutter mounted as described and adapted to be adjusted upward or downward through link and lever mechanisms in reach of the operator riding upon the machine.

7. In a device of the class described, a transverse cutter mounted across the path of the travel of the machine provided with wheels adapted to roll on the ground and support the said cutter as relates to depth, one of said wheels adapted to support one end of the cutter higher than the other.

8. In a device of the class described, a frame supported on traction wheels, a shaft extending across the frame and carrying a series of revolving longitudinal slitting colters and a shaft carrying some transverse revolving cutter blades, in combination with link and lever connections whereby the operator may raise and lower both sets of cutters simultaneously.

Signed at Chicago, in the county of Cook and State of Illinois, this 12th day of August, 1922.

FRANK JOHN FALLADA.

Witnesses:
   Jos. E. Love,
   B. J. Bernhard.